US 6,540,614 B1

(12) United States Patent
Nishino et al.

(10) Patent No.: US 6,540,614 B1
(45) Date of Patent: Apr. 1, 2003

(54) GAME DEVICE INCLUDING A SUBSET FOR DISPLAYING IMAGE INFORMATION

(75) Inventors: Akira Nishino, Tokyo (JP); Kunihiro Shirahata, Tokyo (JP); Takaharu Terada, Tokyo (JP); Katsuhito Goto, Tokyo (JP); Masanobu Tsukamoto, Tokyo (JP); Makoto Hara, Tokyo (JP); Jun Ishida, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/398,150

(22) Filed: Sep. 17, 1999

(30) Foreign Application Priority Data

| Sep. 18, 1998 | (JP) | 10-265502 |
| Oct. 8, 1998 | (JP) | 10-287052 |
| Sep. 8, 1999 | (JP) | 11-254906 |

(51) Int. Cl.$^7$ ............................................... A63F 13/00
(52) U.S. Cl. ........................ 463/40; 463/30; 463/37
(58) Field of Search ..................... 273/148 B; 463/1, 463/30, 31, 34, 35, 37, 38, 40

(56) References Cited

U.S. PATENT DOCUMENTS

| 4,974,857 A | * 12/1990 | Beall et al. ............... 273/371 |
| 5,393,072 A | * 2/1995 | Best ........................... 273/434 |
| 5,528,559 A | * 6/1996 | Lucas ........................ 368/10 |
| 5,759,100 A | * 6/1998 | Nakanishi ................... 463/37 |
| 5,897,437 A | * 4/1999 | Nishiumi et al. ........... 463/47 |
| 5,978,837 A | * 11/1999 | Foladare et al. ........... 709/207 |

FOREIGN PATENT DOCUMENTS

| JP | 285259 | * 6/1994 | A63F/9/22 |

OTHER PUBLICATIONS

Wagner, Dan. Human Factors Design Guide. Jan. 15, 1996., pp. 7–42–7–44. retrieved from the Internet. URL<http://www.hf.faa.gov/ACQUIRE/design_guide_guide.html>.*

* cited by examiner

Primary Examiner—Michael O'Neill
Assistant Examiner—Julie Brochetti
(74) Attorney, Agent, or Firm—Finnegan, Henderson, Farabow, Garrett & Dunner, L.L.P.

(57) ABSTRACT

Provided is a game device capable of notifying a player of the timing for observing individual display units without ruining the game-world view. A game device comprising a first display unit (113) for displaying a, first image in conformity with the game progress and a second display unit (39) for displaying a second image corresponding to the first image further comprises perceptive stimulation elements (34–37) for stimulating the perception of the player operating the game device. In consideration of the game progress, when it is desired for the player to observe the second display unit (39), the perspective stimulation elements (34–37) are individually activated in order to stimulate the perception of the player operating the game device. The player learns the display of individual information by sound or vibration.

23 Claims, 12 Drawing Sheets

MAIN MONITOR

"LIEUTENANT COMMANDER SIR, PLEASE MAINTAIN YOUR DETECTOR."

"BRR, BRR, BRR"  VIBRATION OF DETECTOR

SUB MONITOR

HEAT RAY DETECTOR

P/sec

"AN ENEMY IS NEARBY!"

GAME DEVICE INCLUDING A SUBSET FOR DISPLAYING IMAGE INFORMATION

BACKGROUND OF THE INVENTION

1. Field of the Invention

The present invention generally relates to a game device, and particularly relates to a scheme for effectively notifying a player of an observable screen in a game device for displaying, collectively with controllers and the like, images on two or more display screens.

DESCRIPTION OF THE RELATED ART

Conventionally, there have been game devices wherein a plurality of players are able to simultaneously operate the same game. In this type of game device, two controllers are connected to the game device main body and each player operates the respective controllers while watching the same monitor screen.

Incidentally, numerous games laying stress on scenario presentation have been developed. If a game device comprises a structure capable of providing individual information to the respective players, provided is a novel scenario game. For example, a controller is provided with a small liquid crystal display (LCD) for presenting individual information. Nevertheless, as it is ordinarily difficult for a player to keep close watch on the two images displayed, it is necessary to devise a method for informing the player of the observable monitor. Simply put, considered is game processing wherein symbols or characters are displayed on the monitor, which the player is mainly observing, at a timing for the individual information is to be provided, so that the player will look at the individual information displayed on the controller.

In a game laying stress on scenario presentation, however, it is preferable that the player be buried in the game story so that he/she may advance the game with an illusion of being the main character in such game. Thus, if symbols or arrows are suddenly displayed without any logical connection to the game, there is a possibility that the view of the game world, which is considered important in this type of game, would be ruined.

In consideration of the game progress, when individual information is to be provided to a player, there are cases when it is desirable to provide such information without arousing suspicion to the other player. Thereby, if arrows and the like are displayed on the monitor commonly watched by the players, the secrecy of the individual information cannot be maintained.

For example, upon priorly designating commands for the next strategy or tactics to be employed, the other player will perceive such strategy or tactics if the list thereof is displayed on a common screen (a screen observable by all participating players) and a specific player selects his/her strategy or tactics therefrom.

In light of the aforementioned problems, the inventors of the present invention achieved an effective scheme for notifying information in a game device comprising a plurality of display units.

In other words, an object of the present invention is to provide a game device having a plurality of display units and capable of effectively suggesting the timing for observing a specific display unit without ruining the game-world view.

Another object of the present invention is to provide a game processing method for displaying a plurality of images and capable of effectively suggesting the timing for observing a specific display unit without ruining the game-world view.

Still another object of the present invention is to provide a recording medium storing a program for displaying a plurality of images and capable of effectively suggesting the timing for observing a specific display unit without ruining the game-world view.

A further object of the present invention is to provide a game device capable of secretly providing individual image information to a specific player, such that the other players are uninformed, upon providing image information individually to a plurality of players.

A still further object of the present invention is to provide a novel control system for smooth game processing in a game processing system structured of a game machine main body and a subset. Here, subset shall mean a portable game machine capable of being connected to the same machine main body, and such portable game machine itself is capable of executing a simplified game.

A yet further object of the present invention is to provide a game device, which follows the subject matter of two paragraphs earlier, capable of especially maintaining the fairness of the battle by allowing a player to secretly confirm and designate his/her strategy or tactics indicated on the list in a battle-type game without being noticed by the other players.

SUMMARY OF THE INVENTION

The invention for achieving the aforementioned objects is a game device capable of generating image information in conformity with the game progress and one or more sub image information corresponding thereto; the game device comprising, for each sub image information, perceptive stimulation means for stimulating the perception of the player operating the game device; wherein, when it is necessary to make a player recognize any sub image information, the game device is further capable of activating the perceptive stimulation means corresponding to the sub image information and making the player recognize that he/she should observe the sub image information. Here, "perception" shall be the collective term for all senses recognizable by a person such as the sense of hearing, feeling, smelling, seeing, and so on. "Sub image" shall mean the individual information to be periodically referred to by the player in correspondence with the main image. "Perceptive stimulation means" is means for notifying the player that he/she should observe the sub image, and refers to any structure capable of stimulating the aforementioned perceptions. Although it is preferable that the perceptive stimulation means is provided in the vicinity of the means for presenting the sub image, it may also be provided in the vicinity of the main image presentation means. The presentation of image information and sub image information shall include all means capable of making the player recognize the image, such as a display unit, display means, monitor, display, etc.

Another invention for achieving the aforementioned objects is a game device capable of generating first image information in conformity with the game progress and second image information corresponding to the first image information; the game device comprising perceptive stimulation means for stimulating the perception of the player operating the game device; wherein, when it is necessary to make a player recognize the second image information in consideration of the game progress, the game device is further capable of stimulating the perception of the player operating the game device.

Another invention for achieving the aforementioned objects is a game device comprising: a game machine main body for generating the first image information in conformity with the game progress; and a subset for generating the second image information corresponding to the first image information and which has a perceptive stimulation means for stimulating the perception of the player operating the game device in correspondence with commands from the game machine main body; wherein the game machine main body transmits prescribed commands to the subset when it is necessary to make a player recognize the second image information in consideration of the game progress, and the subset is capable of stimulating the perception of the player with the perceptive stimulation means when the commands are transmitted from the game machine main body. Here, "command" shall mean the prescribed orders and information incidental thereto transmitted from the game machine main body.

For example, the perceptive stimulation means is sound generation means for generating prescribed sounds.

According to another invention for achieving the aforementioned objects, the perceptive stimulation means is vibration generation means for generating prescribed vibrations.

Another invention for achieving the aforementioned objects is a game processing method for displaying an image in conformity with the game progress as well as one or more sub images corresponding thereto; wherein, when it is necessary to make a player recognize any sub image information in consideration of the game progress, the game processing method directs the player's attention to the second image by performing the processing for stimulating the perception of the player operating the device in correspondence with the sub image information.

Another invention for achieving the aforementioned objects is a game processing method for displaying a first image in conformity with the game progress and a second image corresponding to the first image; wherein, when it is necessary to make a player mainly observing the first image recognize the second image in consideration of the game progress, the game processing method directs the player's attention to the second image by performing the processing for stimulating the perception of the player operating the game device.

Another invention for achieving the aforementioned objects is a machine-readable recording medium storing a program capable of making a computer execute the game processing method described above.

Here, "recording medium" shall be any medium storing information (mainly digital data and programs) by some type of physical means, and capable of making a processing device such as a computer or dedicated processor perform prescribed functions. In other words, any medium capable of downloading programs on to a computer by some type of means and making the computer perform prescribed functions will suffice. For example, included in the recording medium shall be a flexible disk, secured disk, magnetic tape, optical magnetic disk, CD, CD-ROM, CD-R, DVD-RAM, DVD-ROM, DVD-R, PD, MD, DCC, ROM cartridge, RAM memory cartridge with battery backup, flash memory cartridge, non-volatile RAM cartridge, and so on. Also included are situations when receiving data transfer from a host computer via wire- or radio-communication circuits (public circuits, data-dedicated circuits, satellite circuits, etc.). The so-called Internet shall also be included in the recording medium referred to herein.

Another invention for achieving the aforementioned objects is a game processing system comprising a game machine main body set for generating the first image information and a subset for generating the second image information; wherein the second image information is for setting the characteristic value of the first image information, and the game machine main body has means for restricting the processing of the first image information until the setting of the characteristic value is complete.

Another invention for achieving the aforementioned objects is a game processing system comprising a game machine main body set and a subset thereof; wherein the subset has means for executing an image processing program of a prescribed display object; means for transferring data corresponding to this display object to the game machine main body; and means for displaying an image for the player to set the characteristic value of this display object; wherein the game machine main body set has means for executing prescribed image processing of the display object; and means for restricting the image processing of this display object until the setting of the characteristic value of this display object is complete; and wherein the game processing system is structured to display this image processing result on display means.

Another invention for achieving the aforementioned objects is a game device comprising: a game machine main body for generating the first image information in conformity with the game progress; and peripherals for generating the second image information corresponding to the first image information, and which has perceptive stimulation means for stimulating the perception of the player operating the game device in correspondence with commands from the game machine main body; and wherein, when it is necessary to make the respective players recognize the second image information in consideration of the battle game progress for two or more players, the game machine main body transmits prescribed commands to the peripheral, and the peripheral is capable of stimulating the perception of the players with the perceptive stimulation means when the commands have been transmitted from the game machine main body.

According to another invention for achieving the aforementioned objects, the perceptive stimulation means is a display screen provided to the peripheral, and the command is a strategy list for battle.

DESCRIPTION OF THE PREFERRED EMBODIMENTS

The preferred embodiments of the present invention are now explained with reference to the relevant drawings.
(Structure)

Figure 1:
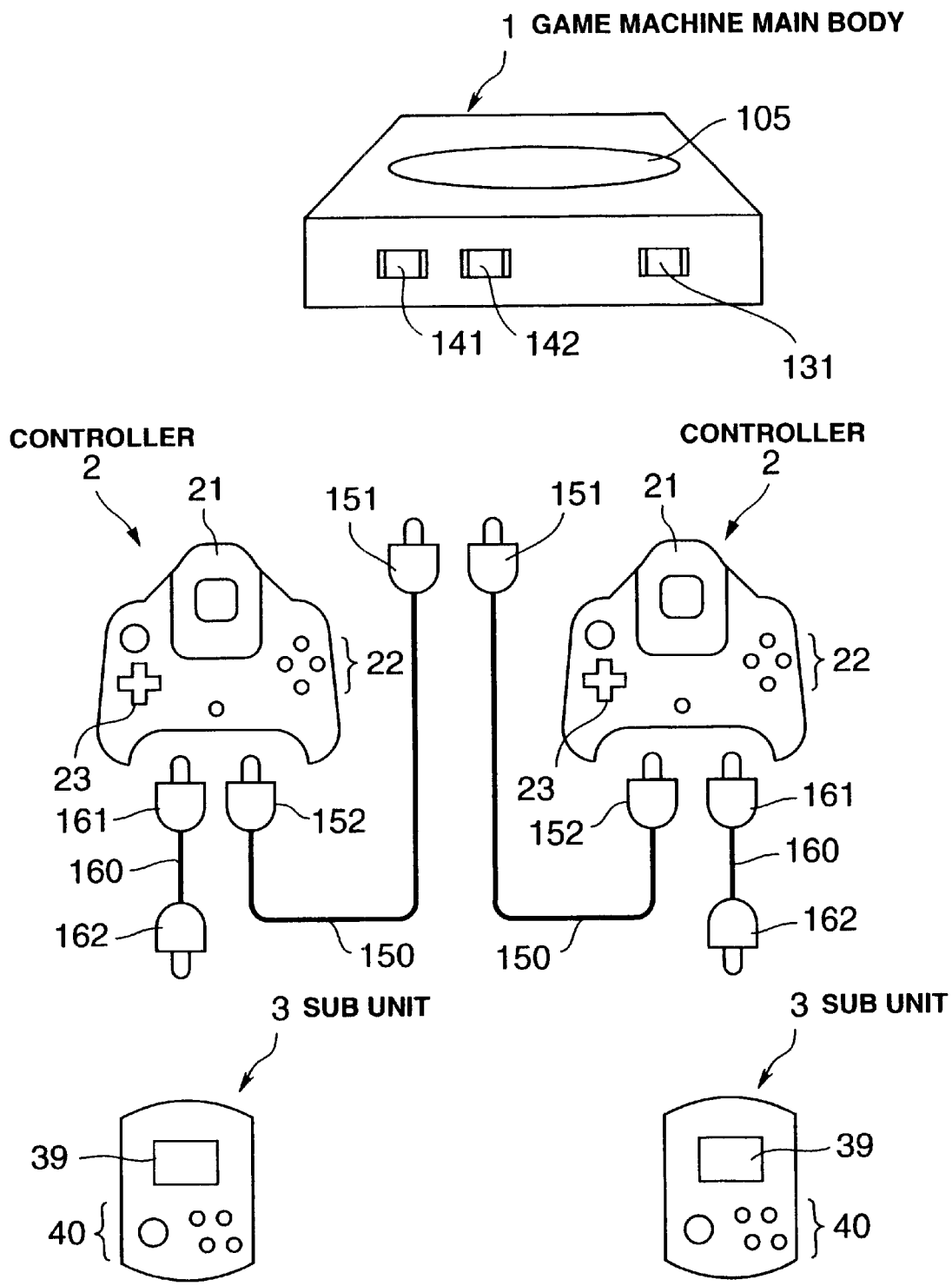
FIG. 1 is conceptual view of the connection of the device according to the first embodiment.

FIG. 1 shows the conceptual diagram of the connection of the game device according to the first embodiment. The game device is structured by mutually connecting a game device main body 1, controller 2, and sub unit (subset) 3.

The game device main body 1 is a control device main body for controlling the game progress. The game device main body 1 is capable of connecting a plurality of controllers 2, and comprises connectors 141, 142 and a modular jack 131 for a communication circuit. The game device main body 1 further comprises a CD-ROM holder 105 for freely installing and removing a recording medium such as a CD-ROM. The controller 2 is structured as an operational unit to be operated by the respective players, comprises an operational button group 22, cross-shaped key 23, etc., and further comprises a connector for connecting the game machine main body 1 and the sub unit 3. The sub unit 3 is for displaying the sub image display and is used by the player to play a sub game, comprises a sub monitor 39 and operational button group 40, and further comprises a connector for connection with the controller 2. The connection cable 150 includes connectors 151 and 152 and is capable of mutually connecting the game machine main body 1 and the controller 2. The connection cable 160 includes connectors 161 and 162 and is capable of mutually connecting the controller 2 and the sub unit 3.

Figure 2:
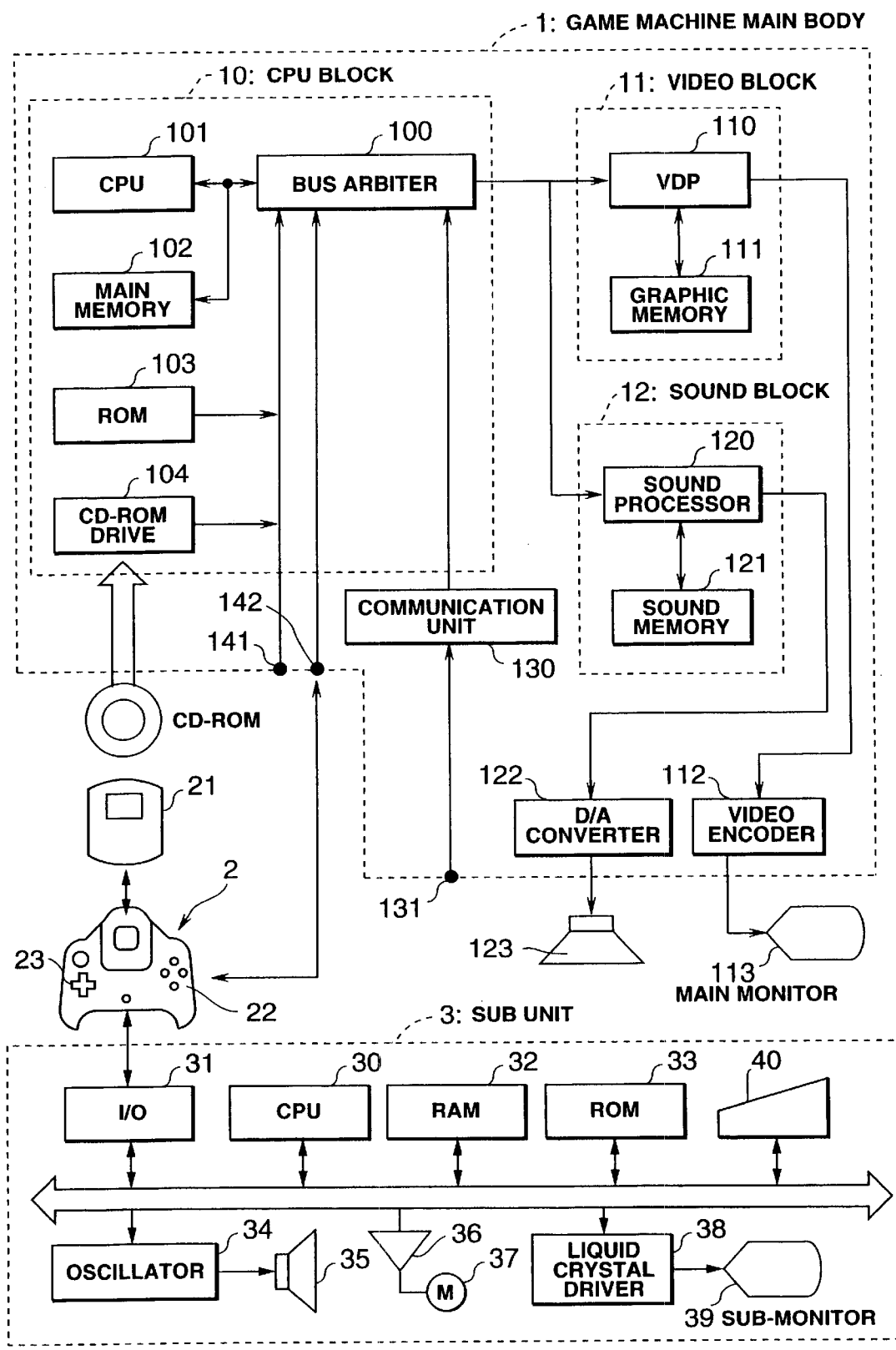
FIG. 2 is a block diagram of the game device according to the first embodiment.

FIG. 2 shows the block diagram of the game device. As shown in FIG. 2, the game device main body comprises a CPU block 10, video block 11, sound block 12, and so on.

The CPU block 10 comprises a bus arbiter 100, CPU 101, main memory 102, ROM 103 and CD-ROM drive 104. The bus arbiter 100 is capable of data transmission/reception by assigning a bus-occupancy time to the devices mutually connected via busses. The CPU 101 is capable of accessing the main memory 102, ROM 103, CD-ROM drive 104, video block 11 and sound block 12, and further capable of accessing the backup memory 21 and sub unit 3 via the controller 2. The CPU 101 executes the initial program stored in the ROM 103 when the power is turned on, initializes the entire device and, when it detects that a CD-ROM is installed in the CD-ROM drive 104, transfers to the main memory 102 program data for the operating system stored in the CD-ROM. The CPU 101 further transfers image data for game processing to the graphic memory 111 and sound data to the sound memory 121. Processing according to the program executed by the CPU 101 is input of control signals from the controller 2 and transmission signals from the transmission device, and pursuant thereto, control of command output to the sub unit 3 and image output by the video block 11, control of sound output by the sound block 12, and so on. The main memory 102 mainly stores the aforementioned program data and programs for the operating system and further provides a work area for storing static variables and dynamic variables. The ROM 103 is a storage area of the initial program loader. The CD-ROM drive 104 is capable of installing a CD-ROM and, when a CD-ROM is installed thereinto, outputs to the CPU 101 data to such effect, and is capable of transmitting data pursuant to the control of the CPU 101. Stored on the CD-ROM are programs for making the game device execute the game processing method of the present invention, image data for image display, sound data for sound output, and so forth. The recording medium is not limited to a CD-ROM and may be any other machine-readable recording medium. The medium may also be structured to transmit data groups such as those stored on the CD-RUM to each memory via the transmission device 130. With this setting, data transmission is possible from fixed disks of servers in distant locations.

The video block 11 comprises a VDP (Video Display Processor) 110, graphic memory 111 and video encoder 112. Stored in the graphic memory 111 is image data read from the CD-ROM as mentioned above. The VDP 110 reads necessary data for image display among the image data stored in the graphic memory 111 and performs coordinate conversion (geometry operation), texture mapping processing, display priority processing, shooting processing and so on in accordance with information necessary for image display supplied from the CPU 101, such as command data, viewpoint position data, light source position data, object designation data, object position data, texture designation data, texture density data, viewing range conversion matrix data, etc. It may also be structured such that the aforementioned coordinate conversion etc. is performed by the CPU 101. That is, upon giving consideration to the operation capabilities of the respective devices, assigning of which processing should be performed by which device is determined. The video encoder 112 is capable of converting image data generated by the VDP 110 to prescribed television signals such as an NTSC format and outputting such signals to the main monitor 113 connected externally.

The sound block 12 comprises a sound processor 120, sound memory 121 and D/A converter 122. Stored in the sound memory 121 is sound data read from the CD-ROM as mentioned above. Based on the command data supplied from the CPU 101, the sound processor 120 reads sound data such as waveform data stored in the sound memory 121 and performs various effects processing pursuant to the DSP (Digital Signal Processor) function as well as DIA conversion processing and so forth. The D/A converter 122 converts sound data generated by the sound processor 120 into analog signals and outputs such signals to the speakers 123 connected externally.

The communication device 130 is, for example, a modem or terminal adapter, connectable to the game device 1, and functions as an adapter for connecting the game device main body 1 and external circuits. The communication device 130 further receives data transmitted from the game-supplying server connected to a public circuit network and supplies this to the busses of the CPU block 10. The public circuit network may be subscriber circuits, dedicated-, wire-, or radio-lines.

The controller 2 periodically converts the operational situation of the operational button group 22 and cross-shaped key 23 into codes and transmits such codes to the game machine main body 1. Operational signals from the respective controllers 2 are used for moving each of the two characters displayed in the game. When a command for the sub unit is sent from the game machine main body 1, the controller 2 further transmits this to the sub unit 3. The controller 2 further transmits to and receives from the game machine main body 1 setting data of characters and parameters for specifying the game processing situation, reads and writes such data to and from the backup memory 21. The backup memory 21 is freely connectable to the controller 2 and capable of accessing the CPU 101. The backup memory 21 is also a storage area of setting data such as the game progress and game scores arising during the game including settings such as operational methods. This setting data functions as the backup data for restarting the game from the state immediately prior to the power being turned off, and may also be used as data reflecting the operational situation of another game device by switching the backup memory with such game device.

The sub unit 3 functions as a sub monitor device for displaying sub images in correspondence with commands sent from the game machine main body 1 via the controller 2, and also functions as an independent portable game device. Specifically, the sub unit 3 comprises a CPU 30, interface circuit 31, RAM 32, ROM 33, oscillation circuit 34, speaker 35, piezo-activation circuit 36, piezo-element 37, liquid crystal driver 38, sub monitor 39 and operational button group 40. The interface circuit 31 transmits and receives data to and from the controller 2. The RAM 32 is the operational area of the CPU 30. The ROM 33 stores the program for operating the sub unit 3 as the portable game device and also stores sub image data when the sub unit 3 is to operate as a sub monitor unit. Minis sub image data is image corresponding to the image generated by the game machine main body 1. The oscillation circuit 34 generates sound signals of a prescribed frequency by the control of the CPU 30, and the speaker 35 converts such sound signals to sound. These elements (34, 35) are sound generation mechanisms as the perceptive stimulation means. For example, if it is an item capable of generating sounds similar to the sound of "beep, beep, beep" used in a cellular phone, a different structure such as a beeper may be used so as long as it is able to generate sounds recognizable by the player. The piezo-activation circuit 36 generates activation signals of a prescribed frequency by the control of the CPU 30, and the piezo-element 37 inputs such signals, and electromechanically converts such signals to a vibration with a prescribed amplitude. These elements (36, 37) are vibration generation mechanisms as the perceptive stimulation means. For example, if it is an item capable of generating vibration similar to the vibration used for cellular phones, a different structure such as an eccentric motor may be used so as long as it is able to generate vibrations recognizable by the player. The liquid crystal driver 38 comprises a video memory, and renews the drawing data of the video memory by the control of the CPU 30. The sub monitor 39 displays images of drawing data stored in the video memory. These elements (38, 39) are structured so as to make characters and images, such as the LCD in a portable information terminal, recognizable to the player. The CPU 30 displays on the sub monitor 39 sub images corresponding to the game processing in the game machine main body 1 pursuant to the program stored in the ROM 33. And, when a command is sent from the game machine main body 1 via the interface circuit 31, the CPU 30 reads new sub image data from the ROM 33 in correspondence with such command, and renews the sub image to be displayed on the sub monitor 39.

When the command is ordering the generation of sounds, the CPU 30 operates the oscillation circuit 34 and stimulates the perception of the player by generating sounds. When the command is ordering the generation of vibrations, the CPU 30 activates the piezo-activation circuit 36 and stimulates the perception of the player by transmitting vibration to the player holding the sub unit.

Figure 7:
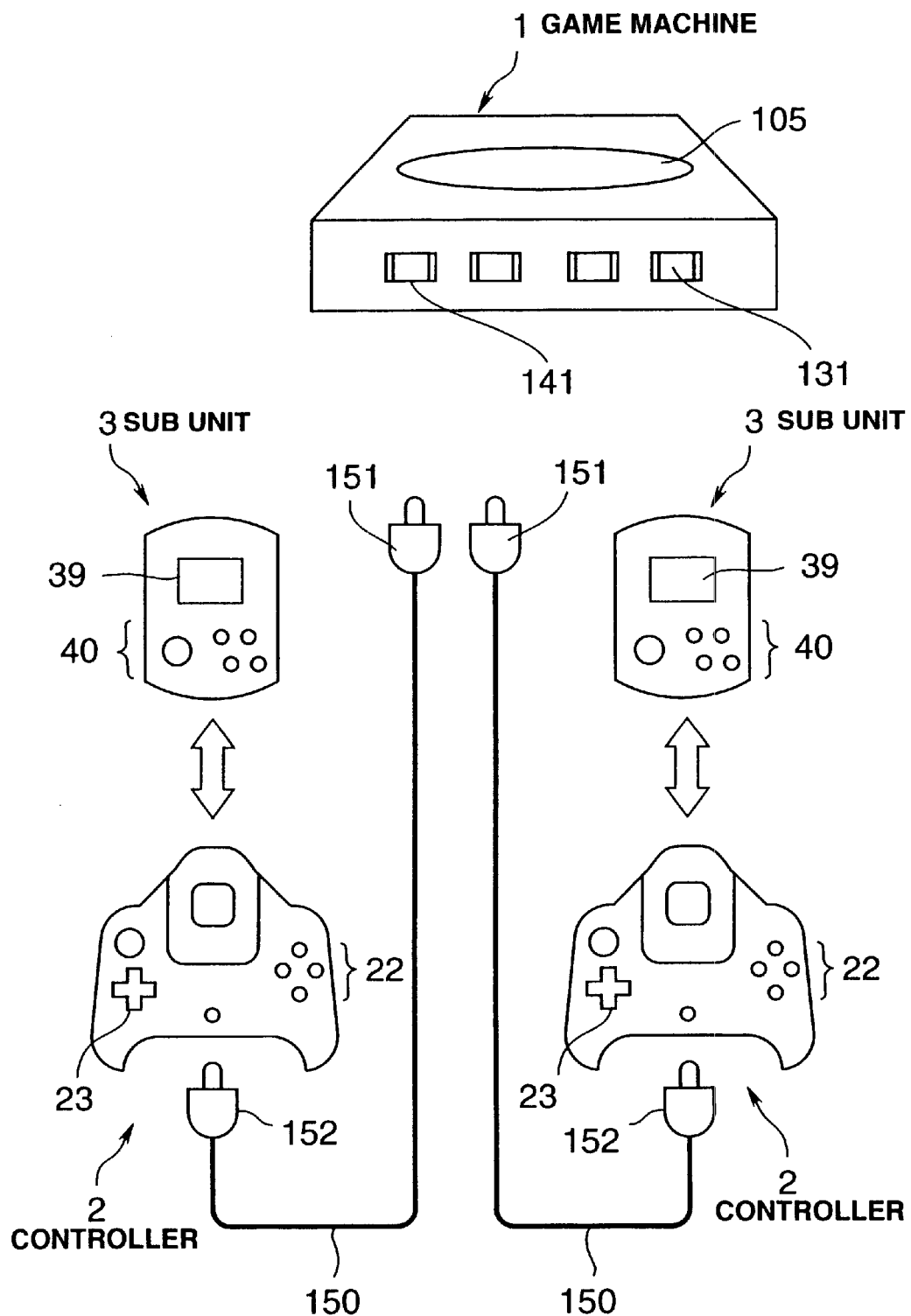
FIG. 7 is diagram explaining the improvement in the game system shown in FIG. 1.

FIG. 7 is a developed version of the first embodiment shown in FIG. 1. The difference between FIG. 7 and FIG. 1 is that the sub unit 3 is capable of being directly connected to the controller 2 without having to go through the connection cable 160. The game machine main body 1 and the controller 2 structure the game machine main body setting.

(Explanation of Operation)

The operation of the game device is now explained. The game laying stress on scenario presentation provided by operating the game device is played by the respective players deciding the movement of the characters corresponding to the cast of a drama,.and the story of travelling the game world is developed. A virtual image of this game world is displayed on the main monitor 113 by the game device main body 1. Meanwhile, displayed on the sub monitor of the sub unit 3 is a sub image of the contents corresponding to the game world displayed on the main monitor 113. The sub unit 3 is not merely a controller, but is set to function as a necessary tool in the game world. For example, if the display content in the main monitor is a scene of "incoming communication" to the character operated by the player, the sub unit 3 will be deemed the "transceiver" operated by the character, and the face of the character who made the communication is displayed on the sub unit 3. As another example, if the display content in the main monitor is a scene of "detecting an enemy" hiding in the game world, the sub unit will be deemed the "detector" operated by the character, and an indicator etc. of the detector will be displayed on the sub monitor 39. Thus, in the game device, the sub unit surpasses the relationship with the controller held by the player as in conventional items, and can be considered as an important tool that structures the game world.

Figure 3:
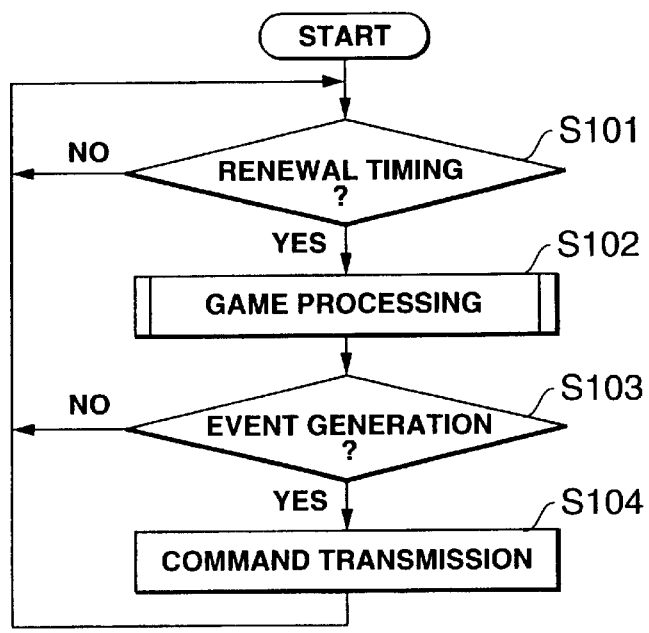
FIG. 3 is a flowchart explaining the operation of the game device main body according to the first embodiment.
Figure 4:
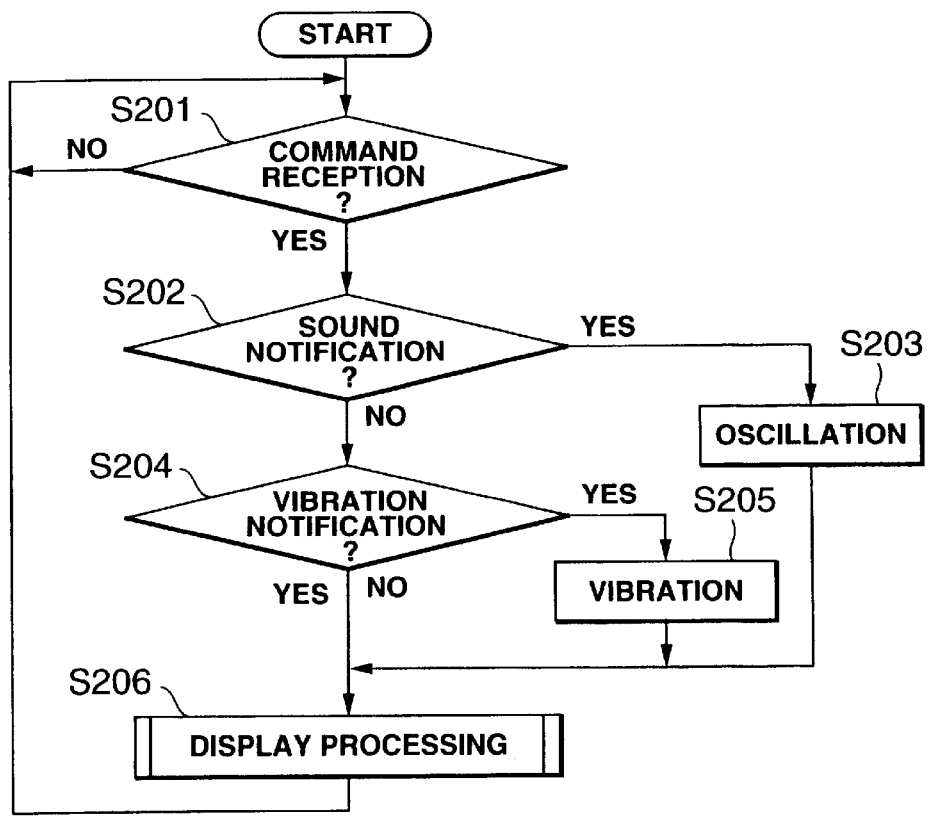
FIG. 4 is a flowchart explaining the operation of the subset according to the first embodiment.

Next, explained is the detailed game processing method in the game device based on the flowcharts shown in FIGS. 3 and 4. FIG. 3 shows the operational outline of the game machine main body 1 and FIG. 4 shows the operational outline in the sub unit.

The game machine main body 1 refers to parameters which determine the movement of the object determined by operation signals and the program for each image renewal timing (e.g., vertical synchronization timing), and generates new image data pursuant thereto. The CPU 101 waits until it becomes a renewal timing (S101; NO) and, when it becomes the renewal timing (S101; YES), performs game processing upon referring to the parameters which set forth the existence of operational signals, game processing, and so on (S102). In other words, the CPU 101 determines the position, posture, viewpoint position, etc. of the character or object to be displayed on the next frame, and transmits commands and image data for generating virtual images to the video block 11. Here, the CPU 101 examines the occurrence of an event in relation to the sub unit 3 during processing (S103).

Figure 5A:
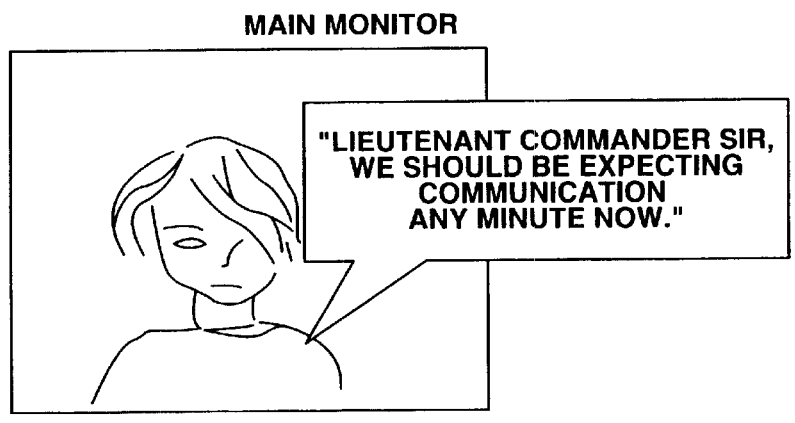
FIG. 5 is a display example of the scenario and image upon using the sound alarm according to the first embodiment.

The aforementioned event is an occurrence of a situation wherein a sub image is to be displayed on the sub unit 3 and the sub unit is to be used as a certain tool. For example, FIG. 5(a) and FIG. 6(a) show situations of an occurrence of an event. In the game world, FIG. 5 is a situation where some type of communication is made to the character operated by the player. The balloon shows the words to be displayed or sounded as character information. In FIG. 5(a), a comrade character is speaking lines to the player suggesting that there is an incoming communication. In the game world, FIG. 6 is a situation where the character operated by the player and other comrades are searching the hiding enemies with a detector. In FIG. 6(a), the comrade is ordering the player to operate the sub unit 3 functioning as the detector.

When an event has not occurred (S103; NO), the CPU 101 waits for the next renewal timing (S101). When an event has occurred (S103; YES), the CPU 101 generates commands in accordance with the contents of such event and transmits the commands to the sub unit 3 via the controller 2 (S104). As examples of such commands, there is a command for specifying the sub image to be displayed on the sub monitor, command for generating electronic sounds, command for generating vibrations, etc.

Meanwhile, in the sub unit 3, the CPU 30 waits until it receives a command (S201; NO) and, when it receives the command (S201; YES), examines the contents of the command. In other words, the CPU 30 examines whether the contents of the command include the processing for stimulating the perception of the player. When the command shows notification by sound (S202; YES), the CPU 30 outputs a sound generation command to the oscillation circuit 34 (S203). Upon receiving the sound generation command, the oscillation circuit 34 generates sounds similar to the reception of a transceiver such as "beep, beep, beep" from the speaker 35. When the command shows notification by vibration (S204; YES), the CPU outputs a vibration generation command to the piezo-activation circuit 36 (5205). Upon receiving the vibration generation command, the piezo-activation circuit 36 vibrates the piezo-element 37. In correspondence with such command, the CPU 30 displays on the sub monitor 39 sub images concurring with the event or processing situation (S206).

Figure 5B:
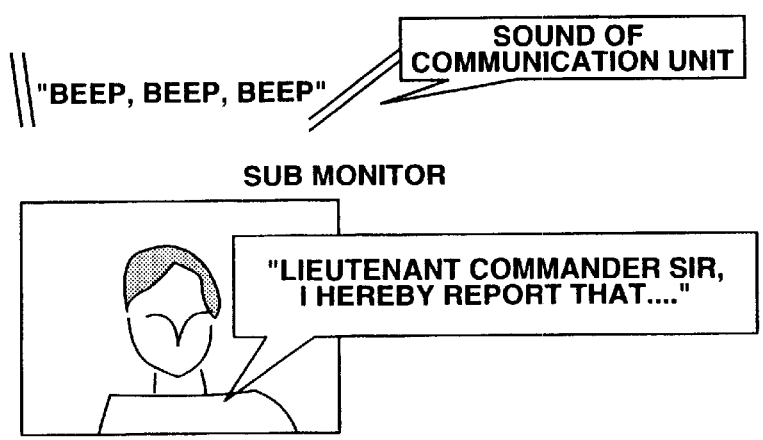
Figure 6A:
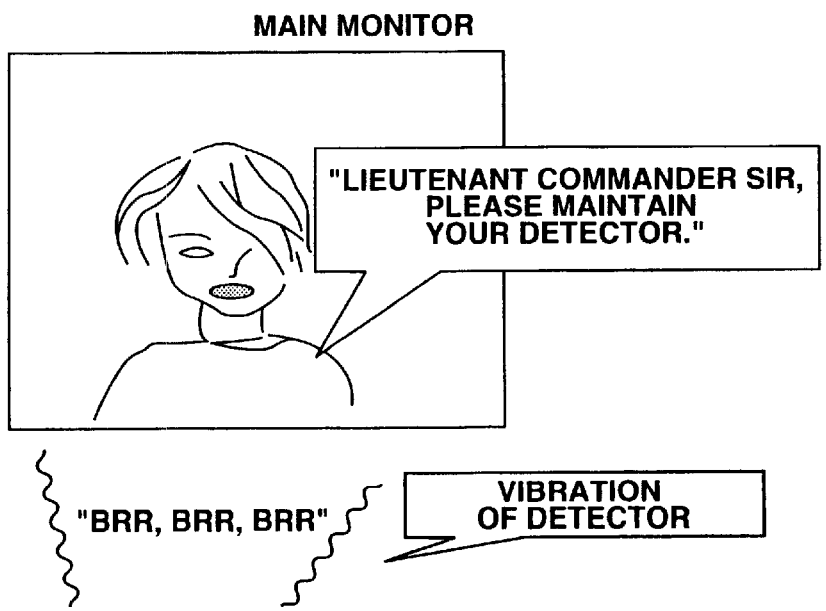
FIG. 6 is a display example of the scenario and image upon using the vibration alarm according to the first embodiment.

These perception stimulation methods are effective in the situations shown in FIGS. 5 and 6 for example. A stimulation example by sound is shown in FIG. 5. As shown in FIG. 5(a), when it is hinted that a communication will soon be received, the sub unit 3 generates sound. Then, the sub image showing the communicator character is displayed on the sub monitor 39 as shown in FIG. 5(b). By this auditory stimulation by sound, the player may recognize the timing in which he/she should notice the sub monitor and experience the feeling as though actually receiving communication with one's transceiver.

Figure 6B:
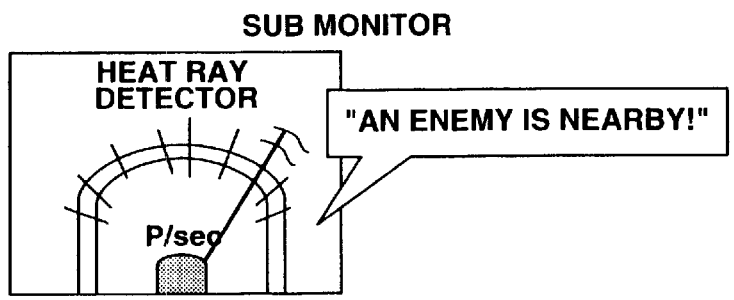

A stimulation example by vibration is shown in FIG. 6. As shown in FIG. 6(a), when the main monitor 113 instructs the player to grab the "detector" and a detector indicator is displayed on the sub monitor 39 as the sub image, the sub unit generates a vibration in correspondence with the command. Then, displayed on the sub monitor is a sub image showing the indicator of the "detector" responding to enemies as shown in FIG. 6(b). By this tactile stimulation by vibration, the player may recognize the timing in which he/she should notice the sub monitor and experience the feeling as though actually having discovered enemies with the player's own detector.

In correspondence with the rate of change to the sub image to be displayed on the sub monitor, the degree of pointer movement when displaying an indicator as the sub image for example, the sound mode (volume, pitch, duration) for the aforementioned auditory stimulation may be changed, or the vibration mode (vibration width, frequency, etc.) for the aforementioned tactile stimulation may be changed accordingly.

By giving variety to the contents of the perceptive stimulation, it is possible to give hint to the player regarding the contents of the sub image. For example, when generating sound, it would be possible to show the contents of the sub image with the volume, rhythm, or melody. If generating vibrations, it would be possible to show the contents of the sub image by preparing a plurality of vibration styles.

As mentioned above, by the game machine main body 1 transmitting to the sub unit 3 appropriate commands in accordance with the game world to be expressed, it is possible to use the sub unit as a transceiver, as a detector, as a weapon, and so on.

The first embodiment of the present invention yields the following advantages:

(1) According to the first embodiment, as it is possible to make the player notice the sub unit as an important tool in the game in correspondence with the game world created on the main monitor, the player may immerse oneself in the game without ruining the game-world view.

(2) According to the first embodiment, as the reception of communication is notified by an electronic sound and the communication contents are displayed on the sub monitor, provided is a simulated environment similar to an actual communication. The player is able to naturally move his/her sight to the sub unit by the sound indicating the reception, recognize the communication contents secretly without the other player knowing, and perform operations in correspondence therewith. As a player may obtain individual information while informing the other player that a communication has been received, it is possible to set a new game scenario not possible heretofore.

3) According to the first embodiment, as the reception of communication is notified by vibration and the cause of such vibration is displayed on the sub monitor, provided is a simulated environment similar to an actual investigation. The player is able to naturally move his/her sight to the sub unit by the vibrations indicating the detection, and perform operations in correspondence therewith. As a player may obtain individual information without the other player knowing the fact of detection, it is possible to set a new game scenario not possible heretofore.

4) According to the first embodiment, as the game machine main body and the sub unit respectively have individual image displaying functions and the correlation of the display contents are set by commands, the processing load will not lean toward a particular device.

(Modification Examples)

The present invention is not limited to the first embodiment mentioned above, and may be employed in various modifications. For example, although the sub unit controlling the sub monitor comprised an individual image display function in the aforementioned first embodiment, all or part of the sub image may be controlled by the game machine main body in order to transmit/receive sub image data. According to this structure, the sub unit will comprise functions for displaying the sub image and generating electronic sounds and vibrations.

Furthermore, although the sub unit comprised a sound generation means and vibration generation means as the perceptive stimulation means in the aforementioned first embodiment, the present invention is not limited thereto. The present invention aims at making the player naturally observe the sub monitor by avoiding the display indicating such sub monitor observation on the main monitor displaying the game world Therefore, any item appealing to the player's five senses is adoptable as the perceptive stimulation means so as long as it is able to make the player observe the sub monitor. For example, adopted may be a visual stimulation means showing some type of reception by flashing a lamp on the sub unit, an olfactory stimulation means showing changes in the situation by generating a smell, a tactile stimulation means which adds some type of mechanical movement, auditory stimulation means generating a voice of a person, and so on. It is preferable that the aforementioned stimulation concurs with the game scenario.

The second embodiment of the present invention is described below. The object of the second embodiment is to provide a game processing system in which the operator or player may smoothly operate the image processing system and game processing system composed of the image processing device main body (game machine main body) and the sub unit. The outline of the system is shown in FIG. 8, and the details of this system are shown in the functional block diagram shown in FIG. 9.

Figure 8:
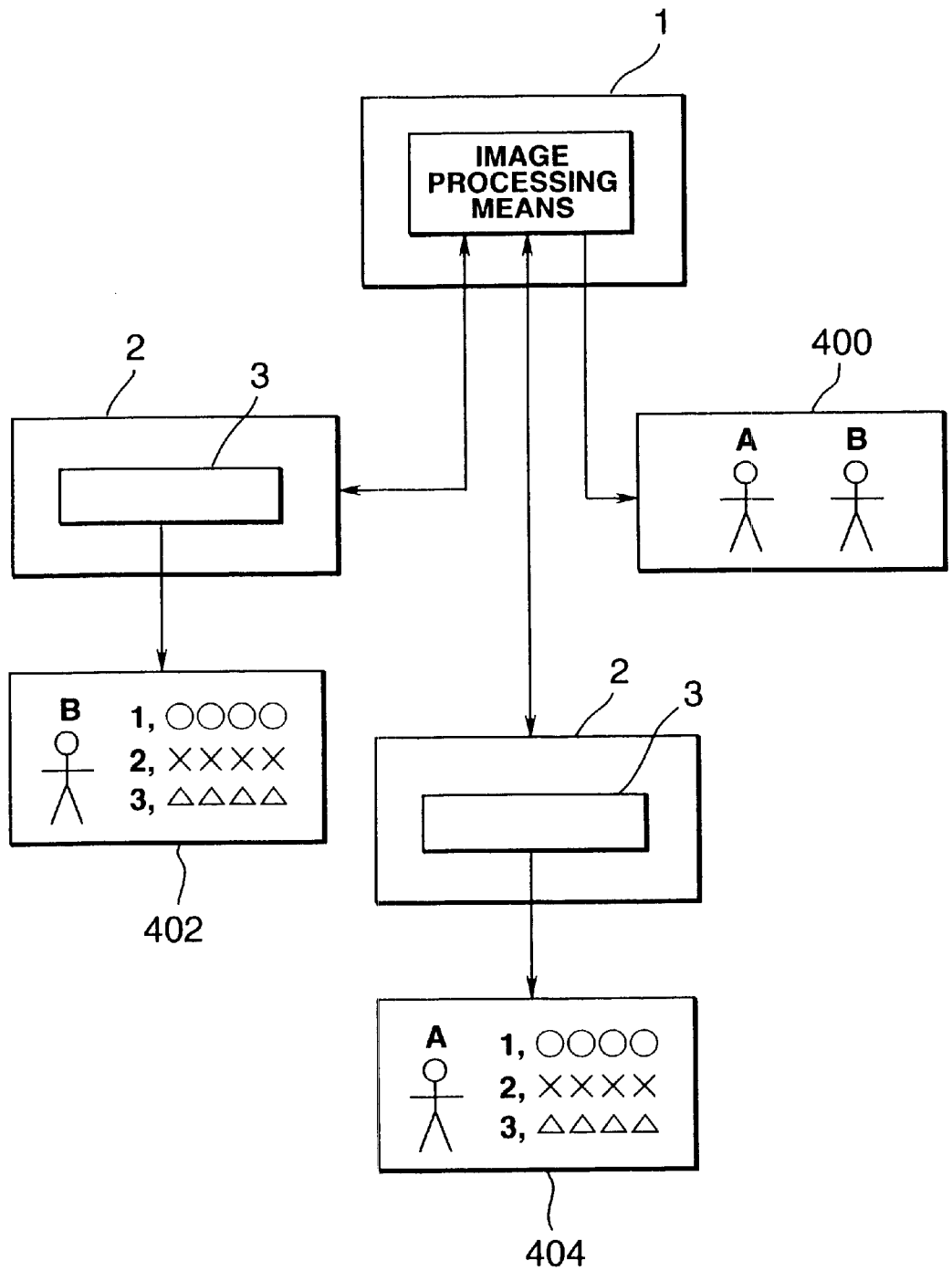
FIG. 8 is a structural diagram explaining the outline of the game system according to the second embodiment.

In FIG. 8, a plurality of controllers 2 are connected to the game machine main body and sub units 3 are respectively connected to each of the controllers. The image processing device generates the first image information in the games machine main body 1. A screen corresponding to this image information is displayed on a TV receiver and the like connected to the game machine main body 1. Reference numeral 400 is an example of this screen, and shows two monsters A and B (first image information) appearing and fighting (image processing) upon receiving key operational information from the respective controllers.

The sub unit 3 generates the second image information and pictures corresponding to this image information are displayed on the LCD of the sub unit. Reference numerals 402 and 404 are respectively examples of such display screen and show "monster" A or B operated by the player and characteristic variations thereof (A. ○○○, B. X X X, C. ΔΔΔ) are shown next to the monster. When the player operates a specific control key and selects a specific characteristic (character parameter), this data is sent from the controller to the game machine main body. The "monster" and characteristics thereof displayed on the LCD correspond to the second image information.

Figure 9:
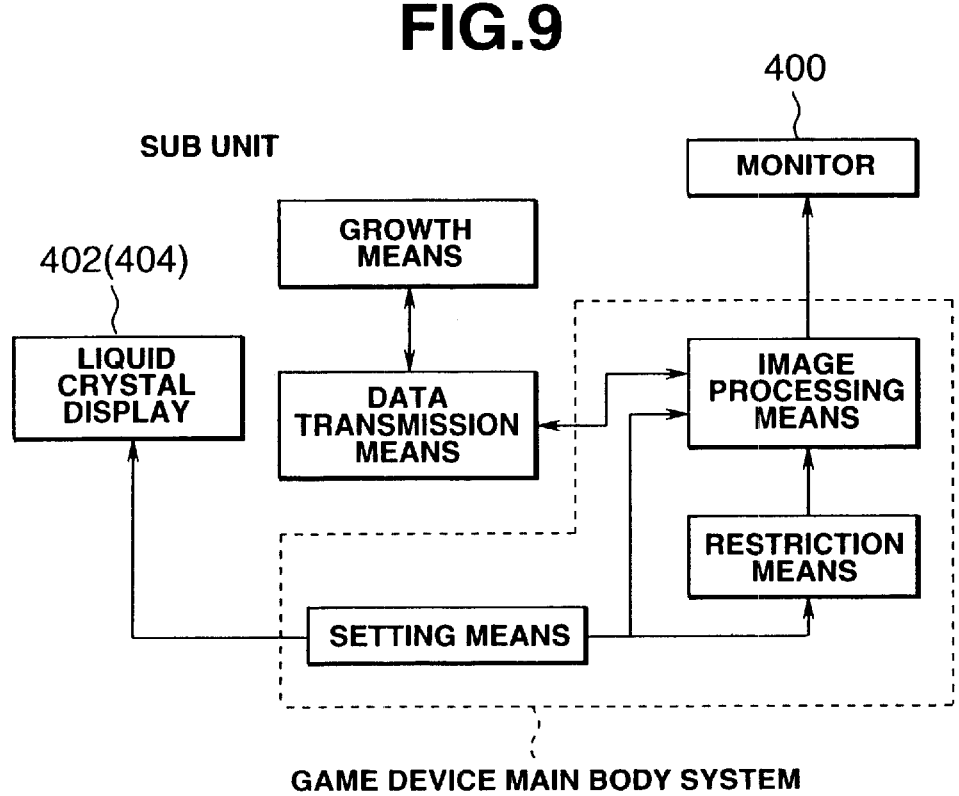
FIG. 9 is a detailed block diagram of the game system according to the second embodiment.

In FIG. 9, growth means is image processing executed by a program for growing the "monster" from childhood to maturity with the sub unit itself operated as a game machine by the player. Data transmission means is for transmitting data of the grown "monster" to the image processing device of the game machine main body. Setting means is for selecting and changing the characteristic values of the "monster" with the key operation of the controller, and the setting data is sent to the image processing means. Image processing means executes the image processing of such incorporated setting data.

Restriction means is for adding a restriction, limitation, suppression, suspension or cessation to the image processing means and such restriction is continued throughout the setting period. Image processing means executes prescribed image processing pursuant to operational data from the controller and, for example, simulates the battle between the monsters as mentioned above. Key operations by the player for the setting may be performed pursuant to the guidance of the aforementioned second image information (400, 402).

Next, the operation of this system is specifically described one by one below.

The player executes the game processing for growing the monster, which is a display object, in the sub unit capable of being operate d as an independent game machine. "Monster" is an example of a character.

The player installs the sub unit to the game machine. Thereafter, by the player operating specific operational buttons, data relating to the respective monsters in the sub unit is sent to the game machine main body. When there are a plurality of players, it is possible to send data of monsters grown by the respective players to the game machine main body. Thereby, the respective players may mutually make their monster fight the monsters of other players.

Next, by the player inputting orders via the controller for making the monsters fight each other in the game machine main body, developed is a battle scene of the monsters in accordance with such input information.

During the processing of this battle game, the player may set prescribed characteristic values to his/her character via the respective controllers. That is, the player may set new characteristic values to the monster or change the existing characteristic values. As examples of the setting processing, there is selection of character characteristics (priority of attacking or guarding), selection of action of the character. (kick, punch, jump), or selection of power value of the character. For this setting, the player displays only on one's own sub unit the setting screen (second image) corresponding to one's own monster. The contents of this setting is not displayed on the screen (first image) corresponding to the game machine main body so that the other players will not know such contents. In other words, information used in the game progress which would be disadvantageous if seen or known by other players is set via the setting screen displayed only on the sub set. The pictures shown in the aforementioned reference numerals 400 and 402 are screens as displayed on the sub unit for the setting mentioned above. Displayed on the respective sub units of the players are an image of one's own monster and the selectable characteristic values next to such monster. Each player's elects and determines one's desired characteristic values with the directional key and determination button on the controller.

Occasionally, a player who is not aware of the petting processing will attack the monster in the midst of such setting processing with another monster grown by the same player. Here, "attack" shall mean one example of image processing performed to the monster, which is a character. At this time, if such attack is permitted as is, the setting via the sub system will be successful and the game may become monotonous or limited. Contrarily, if the setting is to be completed in a short period of time, a problem arises in that the player will not be able to make his/her desired setting. Thus, the aforementioned system resolves such problems by moving to the image processing restriction (alleviation) routine upon judging that the CPU block of the game machine main body is performing setting processing using the sub unit during the execution of the main program, or, with respect to a character.

This routine provides processing for restricting, during the setting, the control operation of the character, which is the subject of setting. For example, in the monitor receiving the processing of the game machine main body, displayed is "elaborating strategy" showing that the character is in the midst of setting and, by notifying this to the other players, processing as in an "attack" to such character is restrained. Or, it is also possible to make the attack to the character impossible or provide such character with a virtual shield during the setting processing, and so on. That is, it is possible to give some type of restriction to the image processing normally permitted during the setting processing. As another example, the attack made to the character may be made ineffective.

Figure 10:
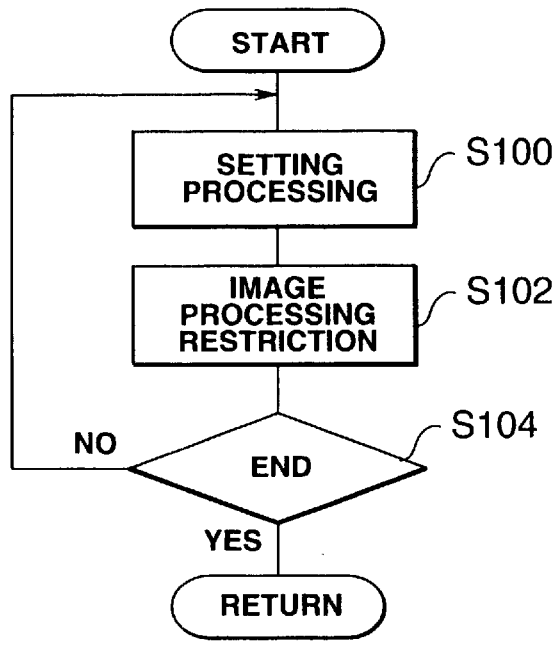
FIG. 10 is an operational flowchart of the game system according to the second embodiment.

In order to realize the above, as shown in FIG. 10, the CPU executing the aforementioned routine foremost judges whether a request for setting processing to the character has been made. If a request has been input, the CPU temporarily stores setting data to a prescribed memory area and executes setting processing (s100), and executes the aforementioned image processing restriction routine (S102). Next, the CPU judges whether or not the setting processing is complete (S104) and, when this is affirmed, the image processing restriction processing is ended, the set data is sent to the image processing means, changes the characteristics of the character in accordance with the setting contents, and returns to the main routine. After returning to the main routine, ordinary image processing such as the simulation of the battle between monsters is continued in accordance with the input situation of the operational buttons on the controller.

Restriction of image processing in the second embodiment means inflicting damage to a character subject to setting processing, but processing which does not inflict damage upon the character does not necessarily have to be restricted. In the present system, it is possible to transfer data character of the game machine main body side to the sub unit 3 via the controller 2. It is further possible to perform a prescribed game processing to this character information and resend this to the image processing means of the game machine main body. Connection to the game machine main body is not limited to two controllers, and three or four controllers may be connected to the game machine main body. It is further possible to provide a setting means on the sub unit side. The respective players may also set strategies, such as to which monster may be attacked, to the game machine main body via the sub unit.

The third embodiment of the present invention is described below. The object of the third embodiment is to provide a game processing system capable of maintaining fairness in a battle game by keeping the player's designation of strategy/tactics by key operations secret from the other players.

The game machine main body 1 employed in this third embodiment may be of the structure shown in FIG. 1 (sub unit 3 is connected to the controller 2 via the connection cable 160 having connectors 161 and 162) or FIG. 7 (sub unit 3 is connected directly to the controller 3 without going through the connection cable 160). Here, employed is the game machine main body 1 shown in FIG. 7, and the detailed description thereof is omitted.

The game machine main body 1 employed in this third embodiment is a product entitled "Dreamcast" manufactured by SEGA ENTERPRISES, LTD., and installed in the CD-ROM holder 105 is "American Football Simulation Game Software (CD-ROM)".

Figure 11:
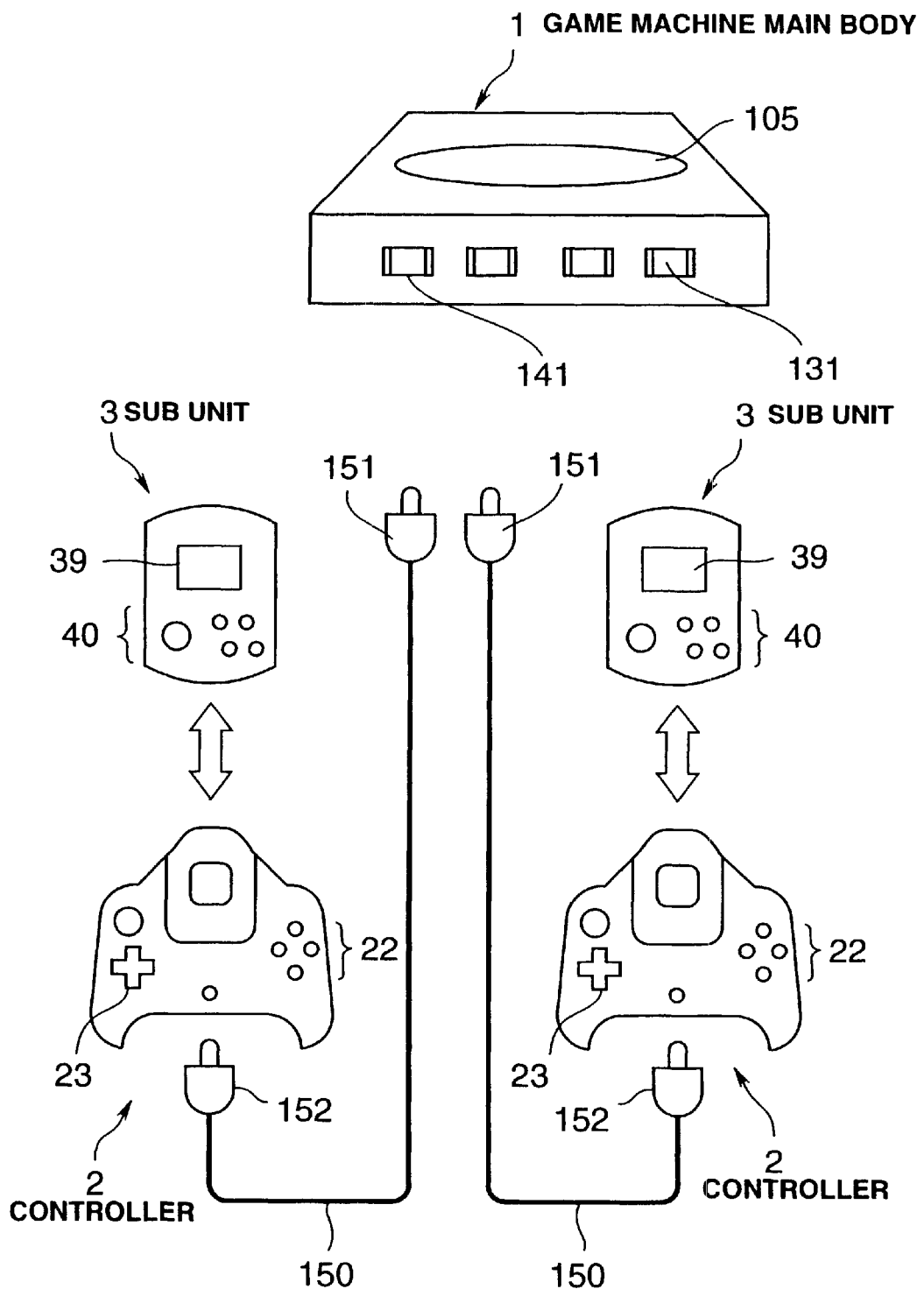
FIG. 11 is a schematic diagram of the game device (equivalent to the game device shown in FIG. 7) according to the third embodiment.
Figure 12:
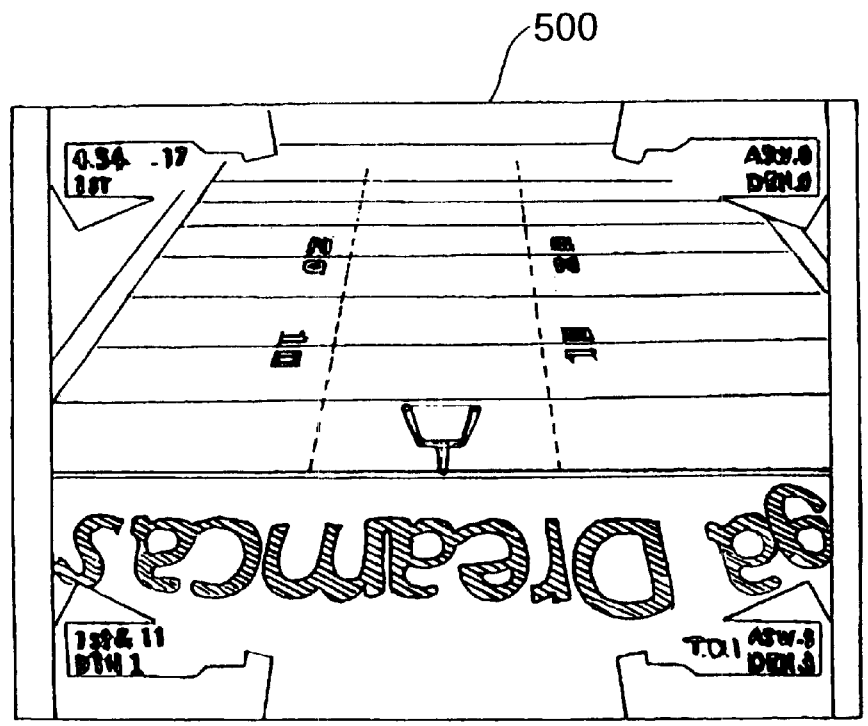
FIG. 12 is a front view of the common screen (TV screen) according to the third embodiment.

In FIG. 11, a plurality of controllers 2 are connected to the game machine main body 1 and sub units are respectively connected to the controllers. The image processing means generates first image information in the game machine main body 1. A screen corresponding to this image information is displayed on the likes of a TV receiver connected to the game machine main body 1. As shown in FIG. 12, reference number 500 is an example of this TV screen and shows a football field seen from a bird's eye view oft(one player and, particularly, is a picture showing a strategic meeting called a "huddle" provided between downs (respectively between first down, second down, third down and fourth down).

Figure 13:
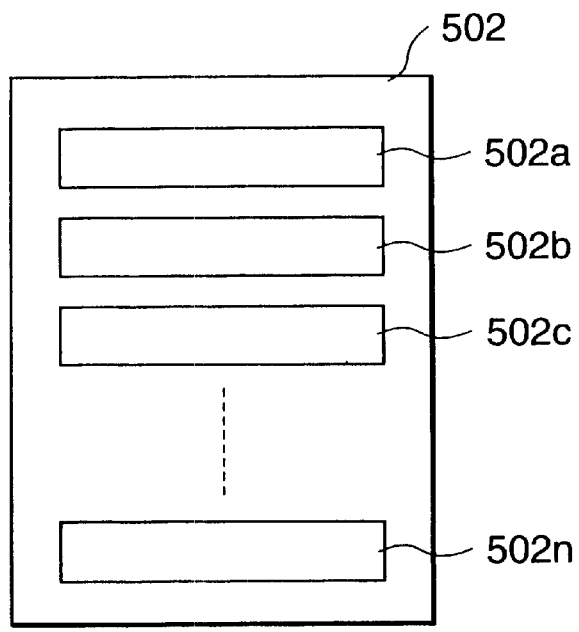
FIG. 13 is a front view showing the respective strategy-list screens displayed on the sub unit according to the third embodiment.

The sub unit 3 generates second image information and a picture corresponding to this image information is displayed on the LCD of the sub unit. As shown in FIG. 13, reference number 502 is an example of the respective display screens and, for example, in the sub unit (reference number 502) for offense, switches 502a, 502b, 503c . . . 502n for selecting the offense formation (T-formation, I-formation, wishbone-formation, shotgun-formation, etc.) are displayed. The sub unit 3 for defense also shows switches for selecting a defense formation.

When the player operates a specific key of the controller and reflects a specific switch, the selected switch is displayed inverted, and the command corresponding to this switch is sent from the controller to the game machine main body. The "switch" displayed on the LCD and the command thereof correspond to the second image information.

In other words, only the "huddle", screen is displayed on the common screen, and the formation selection of offense and defense is implemented on the sub unit 3 connected to the controller 2. Thus, the players may decide the offense and defense formation without the opponent knowing one's strategy.

Figure 15:
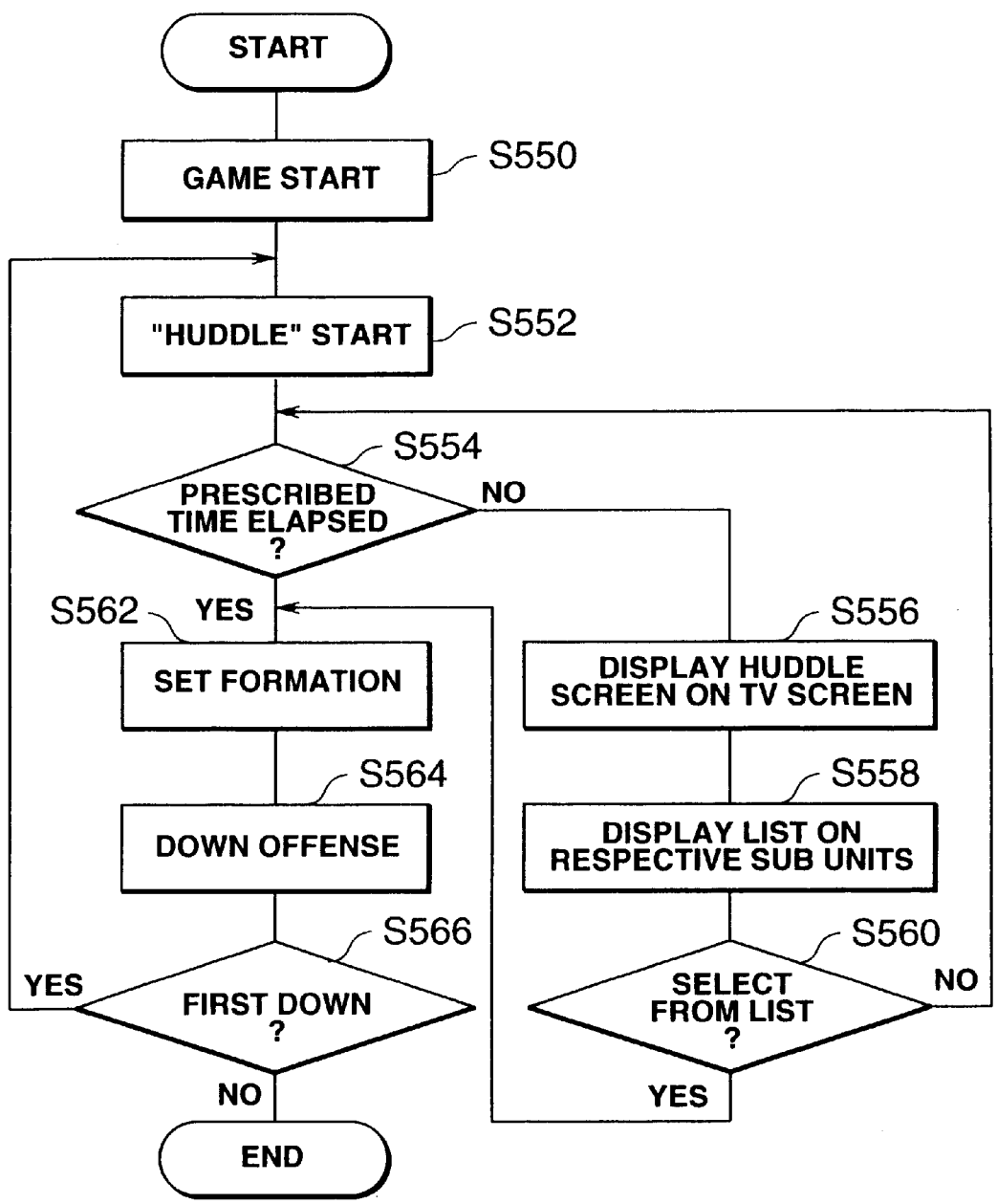
FIG. 15 is an operational flowchart according to the third embodiment.

The outline of the operation of the football game is described with reference to the flowchart of FIG. 15.

The player foremost selects whether to be on the kickoff side (defense) or to be the receiving side (offense).

Next, the game is commenced with the defense team kicking off to the end zone of the offense team from the 35-yard line of the defense side (S550).

The offense is commenced upon an offensive player receiving the kicked ball.

Between each offense, there is a "huddle," and the offensive formation and the defensive formation are determined during such huddle (S552, S554).

In the third embodiment, a screen showing that it is "huddle" time is displayed on the common screen (TV screen, etc.) (S556), but the offensive and defensive formation list is not displayed. This list is displayed on the screen of the sub unit 3 connected to the controller 2 held by the respective players (S558). Thereby, as both players, whether offense or defense, may decide the formation without having the opponent know one's strategy, the players may play the game under fair circumstances.

As a switch is provided (displayed) for each formation on the display screen of the sub unit 3, upon selecting the formation, the player selects a switch corresponding to the desired formation and implements prescribed operations (S560). Thereby, the switch is displayed inverted, a command of such formation for the next offensive down is sent to the game machine main body 1, and the various settings are made (S562).

Next, if the offensive team is able to advance 10 yards by fourth down, that team will obtain a first down and will be able to conduct four additional plays. If the team is unable to advance 10 yards by fourth down, the offense and defense interchange (S564, S566).

If the offensive team is able to advance the ball to the defensive end zone, this is called a "touchdown," and prescribed points will be provided. A field goal will also gain points.

Although the formation list during the "huddle", was not displayed on the common screen (TV screen, etc.) In this third embodiment, such formation list may be displayed on the common screen by changing the setting. For example, there is no reason to display the formation list on the sub unit when the computer is the opponent. Further, when the players are experienced and they desire to explain the operational contents while advancing the game, it is convenient to display the formation list on the common screen.

Figure 14:
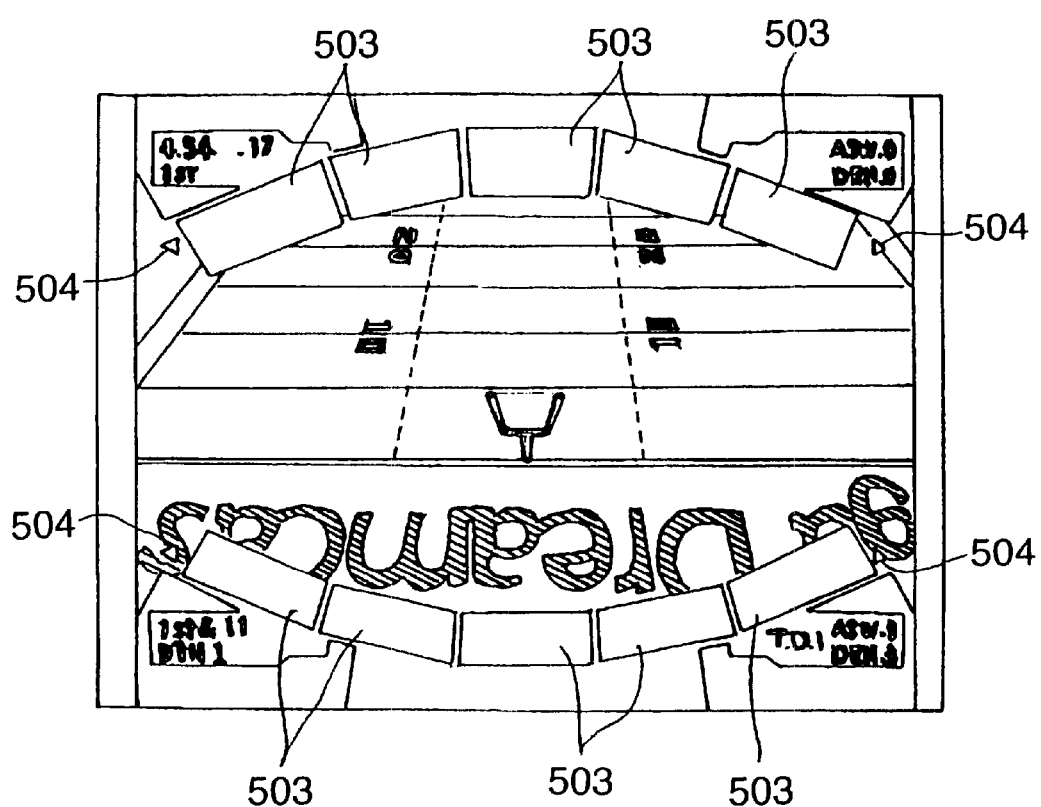
FIG. 14 is a front view showing the case where the respective strategy-list screens are displayed on the common screen (TV screen)

As shown in FIG. 14, this type of monitor screen display divides the offense and defense to upper and lower portions of the screen, and the switches 503 can be displayed in 5-item units. As there are more than five types of formations, however, this third embodiment utilizes the scroll method. A triangular arrow 504 shows the possible scrolling directions and, although not illustrated with reference numerals, the scrolled page (current page/all pages) is displayed.

Furthermore, although the formation list is displayed on the sub unit of the controller 2 in the third embodiment, data to be displayed on the sub unit 3 and command data thereof etc. may be transmitted/received upon connection with a generally employed portable communication terminal (PDA). Further possible is the transmission/reception with cellular phones and PHSs having a communication terminal function and comprising an image display screen.

According to the present invention, as the player's perception is stimulated in correspondence with the display portion in a game device having a plurality of displays, it is possible to make the player observe the displays provided independently in an effective timing without having to display a picture hindering the game-world view. Therefore, in a game scenario of a game using a plurality of display units, it is possible to provide a game in which the player is informed naturally to recognize the display and the burden on the player is lessened.

Moreover, according to the present invention, as a player is informed with a vibration of the timing to observe the display provided independently, it is possible to provide individual image information to a certain player without the other players knowing upon individually providing image information to a plurality of players. Accordingly, in a game scenario of a game using a plurality of display units, it is possible to provide a novel game scenario unavailable heretofore by providing secret information to the players individually.

We claim:

1. A game device capable of generating image information in conformity with a game progress and a plurality of sub image information corresponding thereto, comprising:
    a main unit for connecting to a main monitor for displaying images based on the image information;
    a sub unit for connecting to a sub monitor for displaying images based on the sub image information;
    perceptive stimulation means for non-visually stimulating a perception of a player operating said game device wherein perceptive stimulation means is located in the sub unit; and
    activation means for, when it is necessary to make a player mainly observing the image information in conformity with the game progress recognize any sub image information, activating the perceptive stimulation means corresponding to said sub image information and making the player recognize that he/she should observe said sub image information.

2. A game device capable of generating first image information in conformity with a game progress and second image information corresponding to said first image information, comprising:
    a main unit for connecting to a main monitor for displaying images based on the first image information;
    a sub unit comprising a sub monitor for displaying images based on the second image information;
    perceptive stimulation means for non-visually stimulating a perception of a player operating said game device wherein perceptive stimulation means is located in the sub unit; and
    activation means for, when it is necessary to make a player mainly observing the first image information recognize the second image information in consideration of the game progress, activating the perceptive stimulation means to stimulate the perception of the player operating said game device.

3. A game device comprising:
    a game machine main body for generating first image information in conformity with a game progress; and
    a subset for generating second image information corresponding to said first image information wherein the subset includes perceptive stimulation means for non-visually stimulating a perception of a player operating said game device in correspondence with commands from said game machine main body,
    wherein said game machine main body transmits prescribed commands to said subset when it is necessary to make a player recognize the second image information in consideration of the game progress, and said subset is capable of non-visually stimulating the perception of the player with said perceptive stimulation means when said commands are transmitted from said game machine main body.

4. A game device according to any one of claims 1 through 3, wherein said perceptive stimulation means is sound generation means for generating prescribed sounds.

5. A game device according to any one of claims 1 through 3, wherein said perceptive stimulation means is vibration generation means for generating prescribed vibrations.

6. A game processing method of generating image information in conformity with a game progress and a plurality of sub image information corresponding thereto, the method comprising:
    displaying images on a main monitor based on the image information;
    displaying images on a sub monitor connected to a sub unit based on the sub image information; and
    activating a perceptive stimulation means located in the sub unit to non-visually stimulate a perception of a player of the game progress when it is necessary to make the player recognize the images on the sub monitor.

7. A game processing method of generating first image information in conformity with a game progress and second image information corresponding to said first image information, the method comprising:
    displaying images on a main monitor based on the first image information;
    displaying images on a sub monitor connected to a sub unit based on the second image information; and
    activating a perceptive stimulation means located in the sub unit to non-visually stimulate a perception of a player of the game progress when it is necessary to make the player recognize the images on the sub monitor.

8. A computer-readable medium containing instructions for controlling a computer system to perform at least one of the set of steps comprising:
    displaying images on a main monitor based on image information in conformity with a game progress, displaying images on a sub monitor connected to a sub unit based on a plurality of sub image information corresponding to the image information, and activating a perceptive stimulation means located in the sub unit to non-visually stimulate a perception of a player of the game progress when it is necessary to make the player recognize the images on the sub monitor; and
    displaying images on a main monitor based on first image information in conformity with a game progress, displaying on a sub monitor connected to a sub unit based on second image information corresponding to the first image information, and activating a perceptive stimulation means located in the sub unit to non-visually stimulate a perception of a player of the game progress when it is necessary to make the player recognize the images on the sub monitor.

9. A game processing system comprising:

a game machine for generating first image information; and a subset for displaying second image information for a first player to select a characteristic value of said first image information at any time during a game progress without revealing to a second player that the first player has selected the characteristic value, wherein, said game machine comprises means for restricting processing of said first image information until a setting of said characteristic value is complete.

10. A game processing system comprising:

a game machine main body set and subset thereof, wherein said subset includes:
 means for executing an image processing program of a prescribed display object resulting in a processed display object;
 means for transferring data corresponding to the processed display object to the game machine main body; and
 means for displaying an image for a first player to select a characteristic value of the prescribed display object at any time during a game progress without revealing to a second player that the first player has selected the characteristic value;

wherein said game machine main body set includes:
 means for executing prescribed image processing of the display object based on operational data received from a controller at an arbitrary time during the game process resulting in an changed display object; and
 means for restricting the prescribed image processing of the display object until setting of the characteristic value of the display object is complete; and wherein said game processing system is structured to display the changed display object on a display means.

11. A game processing system according to claim 10, wherein the image processing of the prescribed display object performed by said subset is processing for executing a program which nurtures this display object.

12. A recording medium storing a program for making the game processing system according to any one of claims 9 through 11 execute said game processing.

13. A game device comprising:

A game machine main body for generating first image information in conformity with a game progress and transmitting prescribed commands to a peripheral when it is necessary to make a player recognize second image information in consideration of a battle game progress for two or more players; and peripherals for generating second image information corresponding to said first image information, wherein the peripherals include perceptive stimulation means for stimulating a perception of a player operating said game device in correspondence with the commands from said game machine main body.

14. A game device according to claim 13, wherein said perceptive stimulation means is a display screen provided to said peripheral, and said command is a strategy list for battle.

15. A game device according to claim 13 or claim 14, wherein said peripheral is an operational terminal for transmitting various instructions to said game machine main body.

16. A game device according to claim 15, wherein said peripheral is an auxiliary peripheral attachable to and detachable from said operational terminal.

17. A computer-readable medium containing instructions for controlling a computer system to perform a method comprising:

generating first image information in a game machine main body set;

displaying second image information in a subset for a first player to select a characteristic value of said first image information at any time during a game progress without revealing to a second player that the first player has selected the characteristic value; and restricting the processing of said first image information until the setting of said characteristic value is complete.

18. A game device comprising:

a first display unit for displaying pictures showing a progressive state of a game;

a plurality of input units for respectively incorporating operational information from a plurality of players simultaneously;

a plurality of second display units for respectively displaying to each of the players an image for inputting said operational information; and a game controller for controlling a game progress by incorporating from said input units the operational information including the settings of characteristic values of image information, and preparing pictures showing the progressive state of said game and displaying such pictures on said first display unit.

19. A game device according to claim 18, wherein at least one of said second display units is formed on said input unit.

20. A game device according to claim 19, wherein said game device further comprises perceptive stimulation means for stimulating the perception of the respective players operating said game device, wherein, when the image for inputting said operational information is displayed on said second image displaying unit, said perceptive stimulation means stimulates the perception of the player of said second display unit to which said image was displayed.

21. A game device according to claim 20, wherein said perceptive stimulation means is respectively provided to each of the players.

22. A game device according to claim 21, wherein said game controller controls, in accordance with a player's operation, whether to display the image for inputting said operational information on said second display unit or said first display unit.

23. A game device according to claim 19, wherein said second display units show pictures of items which players' characters are using.

* * * * *